(12) United States Patent
Detlef

(10) Patent No.: US 7,020,703 B2
(45) Date of Patent: Mar. 28, 2006

(54) MESSAGING SYSTEM

(75) Inventor: Michael J. Detlef, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 798 days.

(21) Appl. No.: 09/782,910

(22) Filed: Feb. 12, 2001

(65) Prior Publication Data

US 2002/0112021 A1 Aug. 15, 2002

(51) Int. Cl.
G06F 15/16 (2006.01)
(52) U.S. Cl. ........................ 709/225; 709/232
(58) Field of Classification Search ............... 709/207, 709/221, 225, 227, 228, 232, 238
See application file for complete search history.

(56) References Cited

U.S. PATENT DOCUMENTS

| | | | |
|---|---|---|---|
| 5,291,302 A * | 3/1994 | Gordon et al. | |
| 5,675,507 A * | 10/1997 | Bob, II | |
| 5,712,907 A | 1/1998 | Wegner et al. | |
| 5,974,449 A * | 10/1999 | Chang et al. | 709/207 |
| 6,029,141 A | 2/2000 | Bezos et al. | |
| 6,055,302 A * | 4/2000 | Schmersel et al. | |
| 6,064,980 A | 5/2000 | Jacobi et al. | |
| 6,356,949 B1 * | 3/2002 | Katsandres et al. | |
| 6,446,118 B1 * | 9/2002 | Gottlieb | 709/219 |
| 6,463,292 B1 * | 10/2002 | Rahman | 455/466 |
| 6,463,464 B1 * | 10/2002 | Lazaridis et al. | 709/207 |
| 6,473,805 B1 * | 10/2002 | Lewis | |
| 6,618,710 B1 * | 9/2003 | Zondervan et al. | |
| 6,633,630 B1 * | 10/2003 | Owens et al. | |
| 6,636,733 B1 * | 10/2003 | Helferich | |
| 6,678,361 B1 * | 1/2004 | Rooke et al. | 379/93.24 |

* cited by examiner

Primary Examiner—Andrew Caldwell
Assistant Examiner—Stephan Willett
(74) Attorney, Agent, or Firm—Chernoff, Vilhauer, McClung & Stenzel

(57) ABSTRACT

A messaging system for providing content to a recipient from a content provider using a server and an identifier.

28 Claims, 1 Drawing Sheet

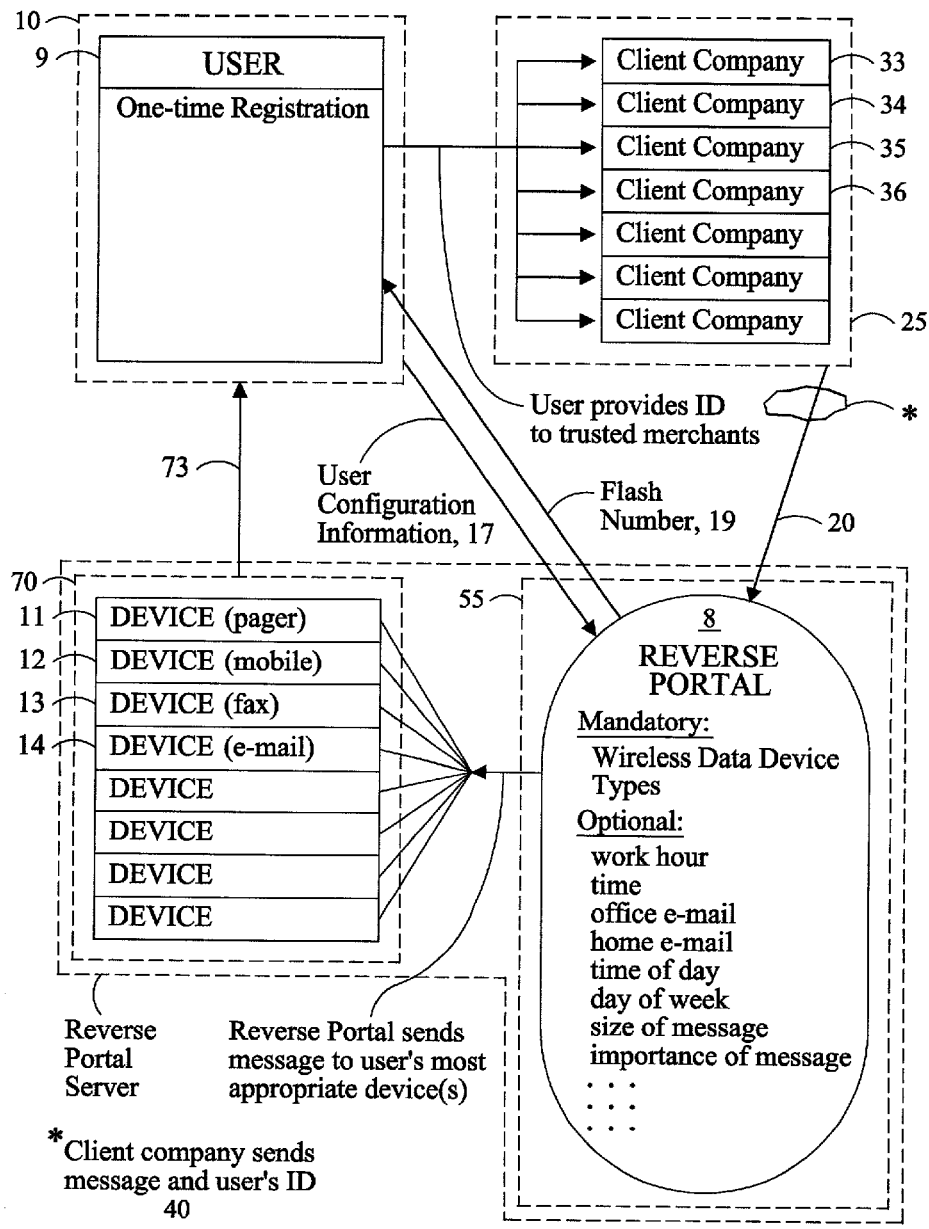
THE FIGURE

MESSAGING SYSTEM

BACKGROUND OF THE INVENTION

The present invention relates to a system for communicating information over a network.

The Internet is an interconnection of individual computer networks that are coordinated to use a compatible data transmission format such as hypertext markup language. The Internet makes available to an end user, or client, a vast number of individual web sites, each having a unique Universal Resource Locator (URL) address by which that site may be addressed.

Historically, any client with a desktop computer and a modem could access the Internet through an Internet service provider (ISP). Once connected through an ISP, clients have available a wide variety of electronic services such as e-mail, along with access to news services, sports and stock tickers, vendors, educational materials, and numerous other resources.

Currently, the Internet is designed so that the client must take the initiative to find the information sought. To this end, the Internet is typically navigated through an interface called a web browser, displayed on a monitor or other device. Through the web browser, an ISP will frequently provide a start page with an assortment of search tools and hypertext links from which the desired web site may be found. Alternately, if the client knows the URL of the page sought, it can simply be typed into the browser.

A navigation system where the client must take the initiative to find the information desired is often referred to as "pull" technology because the client metaphorically pulls the information from the web sites. The advantage of pull technology is its flexibility in adjusting to the instantaneous interests of the client. Pull technology is ideally suited for Internet navigation through a desktop computer or network terminal because the size of the display permits the graphical interface necessary for easy Internet browsing.

With the exponential growth seen in the Internet during recent years, a larger variety of web-enabled devices have become available. Such devices include hand-held devices, alphanumeric pagers, and cell phones. These devices are not ideally suited to pull technology, though, because they either lack sufficient bandwidth or display size. In addition, many of these devices do not have convenient input interfaces.

In response, many attempts have been made at a feasible "push" technology by which a network provider uses a static user profile to select information to send to the client. The problem with these attempts was that the instantaneous interests of the client often differed from that suggested by the static profile, and any attempt to compensate by increasing the range of information sent leaves the client feeling overwhelmed by marginally relevant content.

A refined approach has been to employ the use of "intelligent agents" to retrieve specific information requested by the user. With this approach a client requests information such as the departure time and gate number of an airline flight for which the client has a ticket. The agent software then "scrapes" web sites to retrieve this information. Unfortunately, even this limited approach has significant drawbacks in that the client must register a specific request for each piece of data to be tracked. Further, the agent must make a significant commitment to maintenance because changes in the layout of web pages or format of the data may render the agent software incapable of retrieving the requested information. Finally, if a client has multiple Internet devices, e.g. an alphanumeric pager, a "palm pilot", and a personal computer, such a system lacks the capability of determining the optimal device through which to convey the requested information.

What is desired, therefore, is a system for delivering network content to a mobile Internet device that is highly relevant to the client, that is indifferent to the particular format in which the data is stored, and is sensitive to the routine of the client so that desired information will be transmitted through the optimal Internet-enabled device.

BRIEF DESCRIPTION OF THE DRAWING

The FIGURE shows a schematic of an exemplary embodiment of the present invention.

DETAILED DESCRIPTION OF THE PREFERRED EMBODIMENT

Overview of System Components and Operation

The FIGURE illustrates the general architecture of a system that operates in accordance with the present invention. The system may be used with any conventional hardware and/or software used to communicate over a global network, and particularly over the Internet. As used herein, the Internet refers to a collection of interconnected (public and/or private) networks that are linked together by a set of standard protocols (such as TCP/IP and HTTP) to form a global, distributed network. While this term is intended to refer to what is now commonly known as the Internet, it is also intended to encompass variations which may be made in the future, including changes and additions to standard protocols.

The preferred embodiment includes a reverse portal 8 that provides services to a user 9 who desires access to network based content through various devices such as a pager 11, a mobile device 12, a fax 13, and an e-mail 14 depicted in the FIGURE. These example devices are intended to be illustrative only, and not an exhaustive listing of the types of devices that may be used with the system. The reverse portal 8 is a network server capable of receiving information over the Internet and capable of transmitting information (or otherwise providing information to be transmitted to another device) electronically to the devices 11, 12, 13, and 14. The components and functions required to communicate over the Internet are described more fully in U.S. Pat. Nos. 6,029,141 and 6,064,980, the complete disclosures of which are herein incorporated by reference. The devices 11, 12, 13, and 14 may be any type that allows a user to receive, interactively or otherwise, information transmitted electronically by the reverse portal 8.

Through a registration function 10, the user (recipient) 9 provides the reverse portal 8 with configuration information 17 including the type of, and communication numbers for, selected devices 11, 12, 13, and 14. The user 9 may also optionally register a user profile, which will be more fully described later. In response, the reverse portal 8 provides the user 9 with a unique number or other identification character sequence 19. The number 19 is referred to herein for matters of convenience as a flash number. It is to be understood that content may be provided to any number of devices, as desired.

The system further includes a client content selection function 25 by which the user 9 selects the particular network content he or she wishes to receive. This function is accomplished by providing the flash number 19 to selected client companies 33, 34, 35, and 36 from whom service is desired. Any number of client companies may be selected as desired.

After a client company has received the flash number 19, the client companies 33, 34, 35 and 36 may provide information to the reverse portal 8 in any manner, such as the client-company transmission function 40 depicted in the FIGURE. The transmission function 40 preferably transmits an encrypted data stream 20 to the reverse portal 8 that includes the flash number 19 to identify the relevant user 9 and the information to be relayed to the user 9.

Upon receipt of the encrypted data stream 20 from a client-company, the reverse portal 8 performs a server-based message processing function 55 and a device independent message gateway function 70 by which the reverse portal converts the protocol of the data stream 20 to match that of the client's devices 11, 12, 13, and 14 and relays the information to the user 9. The data 73 from the gateway function is then provided to the user 9. Alternatively, the processing function 55 may provide the data directly to the user 9. The reverse portal 8 may also optionally use any user profile provided by the client to select the optimal device or devices through which to transmit the received information, as more fully delineated later.

By allowing the client to select the specific information desired, a dramatic improvement over traditional push-based technology is achieved. Whereas current push-based technology uses a static user profile to predict the instantaneous wishes of the user the present system allows the user to selectively control the specific information desired. Any necessity to "scrape" web sites for desired information is also obviated. Moreover, the web-based registration function allows the user to receive information from client companies in a variety of data transmission protocols or formats because the independent message gateway function 70 converts the data to the device-specific protocol prior to the transmission to the user.

Initially, the user 9 registers with the reverse portal 8 the specific network devices to which the user 9 wishes to receive data through the reverse portal 8. The information provided in the registration function 10 preferably includes the type of each device, an access method (fax number, e-mail address, web address, etc.) along with any standard information protocols that the device is capable of deciphering. The user may choose to supply a wide variety of message termination devices ranging from alphanumeric pagers, fax machines, email addresses, cellular phones, and even voice phones. This information allows the reverse portal to act as an intermediary between the user and the client-companies from which information is desired, and also allows the reverse portal to receive information in any standardized data protocol and convert it to the specific protocol needed by the user's device.

Moreover, the registration function 10 may also optionally include information to develop a user profile from which the reverse portal may determine the optimal device to which information should be sent if more than one device is a possible recipient of the relayed data. Such optional information may include the work-hours and time zone of the client, work and home fax numbers, e-mail addresses, time-of-day preferences, day of the week preferences (e.g., Monday-Friday but not Saturday or Sunday), size of message restrictions (e.g., no files greater than a predetermined size), importance of message identities so that important ones are received first or non-important ones are filtered out, and any other information by which the reverse portal may use to identify an optimal recipient device. In addition, the profile may likewise include a list of client companies that are restricted from sending messages to the client.

As also shown in the FIGURE, in the registration function 10, the user 9 may request access to standardized information streams such as sports tickers, stock tickers, and news tickers as a few examples. The reverse portal 8 may maintain a constant connection to, or otherwise periodically check, a variety of such streams and may selectively forward such data to one or more users.

The client company selection function and client company transmission function contemplate that the user may determine the specific content to be relayed by providing a client-company with the client's flash number along with instructions as to what content should be provided. For example, a user may provide an online broker with the flash identifier along with instructions to relay any price changes in the user's portfolio over or below a specified percentage. This system may place an additional burden on the client companies, who may need to adapt their servers to track additional variables. In general, a new record for the flash number may be added to the customer database. In addition, existing systems which today might instruct an individual in a call center to contact the customer may likewise be modified to send the message request to the reverse portal server. It is envisioned that the client-company/reverse portal message exchange may use standard secure Internet communication schemes.

The server-based message processing function may receive and authenticate encrypted transmission requests from the various registered client companies. The server evaluates parameters within the recipient's profile and uses this information to identify the optimal device(s) upon which to terminate the message.

To illustrate the utility of this function, assume that the user purchases airline tickets from an Internet travel agent on short notice and wishes to receive confirmation as soon as possible. The user gives the Internet travel agent the appropriate flash number, who sends the information to the reverse portal in ASCII format. From the user profile, which contains the home and office e-mail addresses, the work schedule, the time zone of the client, etc., the reverse portal determines that the optimal device is a cell phone. The reverse portal then uses a text to speech engine to convert the message into audio samples that are then played over a voice connection through the user's cell phone.

The reverse portal may contain the necessary software and network connections to permit content to be provided to a variety of wired and wireless devices. One advantage of this system is, unlike traditional systems, the client company may not be required to know the specific protocol or message format for the intending terminating device.

The terms and expressions employed in the foregoing specification are used therein as terms of description and not of limitation, and there is no intention in the use of such terms and expressions of excluding equivalents of the features shown and described or portions thereof, it being recognized that the scope of the present invention is defined and limited only by the claims that follow.

The invention claimed is:

1. A method for providing content to at least one of a recipient and at least one of a device comprising:
   (a) a user registering at least one of said recipient and at least one device with a computer server, said server in response to said registering providing an identifier identifying at least one of said recipient and said at least one of device;

(b) said computer server providing said identifier identifying said at least one of said recipient and said at least one device to a plurality of different content providers, where said content providers are separate from said computer server and separate from each other;

(c) said at least one of said recipient and said at least one of device providing said identifier to a plurality of different said content providers, each of said content providers in response to having said identifier identifying respective said content desirable to said recipient;

(d) each of said content providers providing said content to said computer server together with said identifier free from said computer server specifically requesting said content from respective ones of said content providers; and (e) said computer server, in response to receiving said content from said content providers, providing said content from each of said content providers to at least one of said at least one device and said recipient.

2. The method of claim 1, wherein said registering includes at least one of:

(a) a communication protocol for providing said content to said device; and (b) an access technique for providing said content to said device.

3. The method of claim 2 wherein said registering is said communication protocol.

4. The method of claim 2 wherein said registering is said access technique.

5. The method of claim 1 wherein said identifier identifies said recipient.

6. The method of claim 1 wherein said identifier identifies said at least one device.

7. The method of claim 1 further comprising said server providing said identifier to said recipient in response to registering said at least one device.

8. The method of claim 1 wherein said recipient indicates to said content provider desirable said content.

9. The method of claim 1 wherein said content provided by said server is provided to said at least one device.

10. The method of claim 1 wherein said content provided by said server is provided to said recipient.

11. The method of claim 1 wherein said server and said content provider are interconnected to the Internet.

12. The method of claim 1 wherein said at least one device includes a pager.

13. The method of claim 1 wherein said at least one device includes a fax.

14. The method of claim 1 wherein said at least one device includes a mobile communication device.

15. The method of claim 1 wherein said at least one device includes a phone.

16. The method of claim 1 wherein said at least one device includes e-mail.

17. The method of claim 1 further comprising associating a user profile with said identifier.

18. The method of claim 17 further comprising providing said user profile to said server.

19. The method of claim 1 further comprising providing said identifier identifying at least one of said recipient and said at least one device to a plurality of content providers.

20. The method of claim 19 further comprising providing said content to said server from said plurality of content providers.

21. The method of claim 20 further comprising said server providing said content from said plurality of content providers to at least one of said at least one device and said recipient.

22. The method of claim 1 further comprising said server formatting said content to a format suitable for said at least one device.

23. The method of claim 1 further comprising said server formatting said content to a plurality of formats suitable for a respective one of said at least one device.

24. The method of claim 17 further comprising said server selectively providing said content to said at least one device based upon said user profile.

25. The method of claim 24 wherein said profile includes information related to day of week preferences.

26. The method of claim 24 wherein said profile includes information related to size of message restrictions.

27. The method of claim 24 wherein said profile includes information related to time of day restrictions.

28. The method of claim 24 wherein said profile includes information related to work schedule restrictions.

* * * * *